US005192617A

United States Patent [19]

Stofko, Jr. et al.

[11] Patent Number: 5,192,617

[45] Date of Patent: Mar. 9, 1993

[54] TRANSPARENT LIQUID ABSORBENT MATERIALS

[75] Inventors: John J. Stofko, Jr., St. Paul, Minn.; Mohammad Iqbal, Austin, Tex.

[73] Assignee: Minnesota Mining and Manufacturing Company, St. Paul, Minn.

[21] Appl. No.: 893,915

[22] Filed: Jun. 4, 1992

Related U.S. Application Data

[62] Division of Ser. No. 602,481, Oct. 24, 1990, Pat. No. 5,134,198.

[51] Int. Cl.$^5$ .............................................. B32B 9/04

[52] U.S. Cl. ................................. 428/411.1; 525/205; 525/328.2; 525/353; 525/359.3; 525/359.5

[58] Field of Search ..................... 428/411.1; 525/205, 525/328.2, 353, 359.3, 359.5

[56] References Cited

U.S. PATENT DOCUMENTS

| | | | |
|---|---|---|---|
| 4,128,538 | 12/1978 | Burness et al. | 525/328.2 |
| 4,547,405 | 10/1985 | Bedell et al. | 427/256 |
| 4,554,181 | 11/1985 | Cousin et al. | 427/261 |
| 4,555,437 | 11/1985 | Tanck | 428/212 |
| 4,578,285 | 3/1986 | Viola | 427/209 |
| 4,592,951 | 6/1986 | Viola | 428/323 |
| 4,636,805 | 1/1987 | Toganoh et al. | 428/210 |
| 4,642,247 | 2/1987 | Mouri et al. | 427/214 |
| 4,910,084 | 3/1990 | Yamasaki et al. | 525/359.5 |
| 5,030,697 | 7/1991 | Hugl et al. | 525/328.2 |
| 5,057,579 | 10/1991 | Fock et al. | 525/359.5 |
| 5,134,198 | 7/1992 | Stofko, Jr. et al. | 525/205 |

FOREIGN PATENT DOCUMENTS

| | | |
|---|---|---|
| 0232040 | 8/1987 | European Pat. Off. . |
| 0365307 | 4/1990 | European Pat. Off. . |
| 0297108 | 8/1990 | European Pat. Off. . |
| 61-135788 | 6/1986 | Japan . |
| 61-230978 | 10/1986 | Japan . |
| 61-235182 | 10/1986 | Japan . |
| 61-235183 | 10/1986 | Japan . |
| 61-261089 | 11/1986 | Japan . |
| 61-293886 | 12/1986 | Japan . |
| 62-032079 | 2/1987 | Japan . |

*Primary Examiner*—Melvyn I. Marquis
*Assistant Examiner*—Helen F. Lee
*Attorney, Agent, or Firm*—Gary L. Griswold; Walter N. Kirn; David L. Weinstein

[57] ABSTRACT

Crosslinked polymeric compositions capable of forming continuous matrices for liquid absorbent, semi-interpenetrating polymer networks. These networks are blends of polymers wherein at least one of the polymeric components is crosslinked after blending to form a continuous network throughout the bulk of the material, and through which the uncrosslinked polymeric components are intertwined in such a way as to form a macroscopically homogeneous composition. The compositions of this invention can be used to form durable, ink absorbent, transparent graphical materials.

22 Claims, No Drawings

TRANSPARENT LIQUID ABSORBENT MATERIALS

This is a division of application Ser. No. 07/602,481 filed Oct. 24, 1990, U.S. Pat. No. 5,134,198.

BACKGROUND OF THE INVENTION

1. Field of the Invention

This invention relates to transparent materials that are capable of absorbing liquids, and, more particularly, to materials that can be used as ink-receptive layers for transparent imageable materials.

2. Discussion of the Art

Transparent materials that are capable of absorbing significant quantities of liquid, while maintaining some degree of durability and transparency, are useful in contact lenses, priming layers for aqueous coatings, fog-resistant coatings, and transparent imageable materials for use in mechanized ink depositing devices, such as pen plotters and ink-jet printers. Transparent imageable materials are used as overlays in technical drawings and as transparencies for overhead projection. It is desirable that the surface of liquid absorbent materials for use in transparent graphical applications be tack free to the touch even after absorption of significant quantities of ink.

During normal use of pen plotters and ink-jet printers, the inks used in such machines are exposed to open air for long periods of time prior to imaging. However, even after such exposure to air, the ink must still function in an acceptable manner, without deterioration, and, in particular, without loss of solvent. In order to meet this requirement, ink formulations typically utilize solvents of very low volatility, such as water, ethylene glycol, propylene glycol, and other like solvents. Inks such as these, which contain water and water-miscible solvents, will hereinafter be called aqueous inks, and the solvents used therein will hereinafter be called aqueous liquids. Materials that are receptive to aqueous liquids will hereinafter be called hydrophilic compositions.

Because of the low volatility of aqueous solvents, image drying by means of evaporation is very limited. In the case of imaging onto paper, a significant amount of the solvent diffuses into the sheet. Because of the fibrous nature of paper, drying by diffusion occurs very rapidly, and the surface appears dry to the touch within a very short time. In the case of imaging onto polymeric film, some means of absorbing aqueous solvents is needed if satisfactory image drying is to occur.

Compositions useful as transparent liquid absorbent materials have been formed by blending a liquid-insoluble polymeric material with a liquid-soluble polymeric material. The liquid-insoluble material is presumed to form a matrix, within which the liquid soluble material resides. Examples of such blends are the transparent water absorbent polymeric materials disclosed in U.S. Pat. Nos. 4,300,820 and 4,369,229, wherein the matrix forming polymer is a terpolymer comprised of hydrophobic monomeric units, hydrophilic monomeric units, and acid-containing monomeric units, with the water-soluble portions of the compositions being polyvinyl lactams.

Other examples of blends comprising water-soluble and water-insoluble polymeric compositions are disclosed in European Patent Application No. EP 0 233 703, wherein water-insoluble acrylic polymers having acid functionality are blended with polyvinyl pyrrolidone for use as ink-receptive layers on films to be imaged by ink-jet printers or pen plotters.

A problem that frequently arises in the formulation of polymer blends is the incompatibility of the polymers being blended. It is well-known that polymeric materials having widely differing properties generally tend to be incompatible with one another. When attempts are made to blend polymers that are incompatible, phase separation occurs, resulting in haze, lack of transparency, and other forms of nonhomogeneity.

Compatibility between two or more polymers in a blend can often be improved by incorporating into the liquid-insoluble matrix-forming polymer chains monomeric units that exhibit some affinity for the liquid-soluble polymer. Polymeric materials having even a small amount of acid functionality, as in the patents cited previously, are more likely to exhibit compatibility with polyvinyl lactams. Generally, the compatibility of polymers being blended is improved if the polymers are capable of hydrogen bonding to one another.

A second form of incompatibility noted in using blends of liquid-absorbent polymers is the incompatibility of the matrix forming insoluble polymer with the liquid being absorbed. For example, if the liquid being absorbed is water, and if the water-insoluble polymers are hydrophobic, some inhibition of water absorption ability can be expected. One method of overcoming this difficulty is to utilize hydrophilic matrix polymers that are not water soluble at the temperatures at which they are to be used, though they may be water soluble at a different temperature. In U.S. Pat. No. 4,503,111, ink-receptive coatings comprising either polyvinyl alcohol or gelatin blended with polyvinyl pyrrolidone are disclosed. Both polyvinyl alcohol and gelatin, being water-insoluble at room temperature, are able to act as matrix forming polymers for these coatings, and the coatings are quite receptive to aqueous inks. However, the coatings do exhibit a tendency to become tacky, either because of imaging, or because of high humidity.

It therefore becomes clear that while blends of soluble and insoluble polymers may be useful as liquid absorbent compositions, they suffer major limitations in liquid absorption ability and in durability.

SUMMARY OF THE INVENTION

This invention provides a liquid-absorbent composition comprising (a) a polymeric matrix component comprising crosslinked tertiary amino moieties, and (b) a liquid-absorbent component comprising a water-absorbent polymer, preferably a water-soluble polymer. This composition is capable of forming liquid-absorbent, semi-interpenetrating polymeric networks, hereinafter called SIPNs. The SIPNs disclosed herein are polymeric blends wherein at least one of the polymeric components is crosslinked after blending to form a continuous network throughout the bulk of the material, and through which the uncrosslinked polymeric components are intertwined in such a way as to form a macroscopically homogeneous composition. It has been found that SIPNs of this invention are capable of absorbing significant quantities of those liquids that are solvents for the uncrosslinked portion of the SIPN without loss of physical integrity and without leaching or other forms of phase separation. In cases where the SIPNs are initially transparent, they remain transparent after absorption of significant quantities of liquids.

The nature of the crosslinking used in the formation of the matrix components of the SIPNs is such that it combines durability in the presence of the liquids encountered during use with compatibility toward the absorbent component. The nature of the crosslinking should also be such that it does not interfere with pot-life and curing properties that are associated with commonly available methods of processing. More particularly, crosslinking should be limited to the matrix component of the SIPN, and should not cause phase separation or other inhomogeneity in the SIPN.

The present invention provides polymeric matrices which result in transparent compositions capable of providing improved combinations of ink absorption and durability, while at the same time retaining transparency and being amenable to the types of processing commonly used in producing transparent graphical materials.

DETAILED DESCRIPTION

The crosslinked portion of the SIPN will hereinafter be called the matrix component, and the liquid-absorbent portion will hereinafter be called the absorbent component.

The matrix component of the SIPN of the present invention uses crosslinkable polymers incorporating tertiary amino groups therein. Such tertiary amino groups can be provided as part of the monomeric units used in the formation of the polymer, or they can be grafted into the polymer after the formation of the polymeric backbone.

Crosslinking can be performed by means of multifunctional alkylating agents, each functional part of which forms a bond with a polymer chain through a tertiary amino group by quaternization of the trivalent nitrogen of the tertiary amino group. Difunctional alkylating agents are suitable for this purpose. In the case where the tertiary amino group is pendant to the backbone of the chain, this crosslinking reaction is depicted as follows:

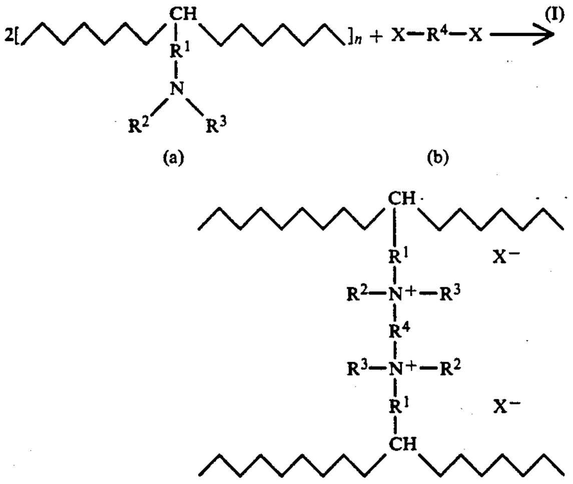

(a) (b) (c)

wherein $R^1$ represents a group selected from substituted and unsubstituted alkyl, amide, or ester group, preferably having no more than 10 carbon atoms, more preferably no more than 5 carbon atoms, substituted and unsubstituted aryl group, preferably having no more than 14 carbon atoms, $R^2$, $R^3$, and $R^4$ independently represent a group selected from the group consisting of substituted and unsubstituted alkyl groups, preferably having no more than 10 carbon atoms, more preferably no more than 5 carbon atoms, and substituted and unsubstituted aryl groups, preferably having no more than 14 carbon atoms. Additionally, $R^2$ and $R^3$ can be connected to form the substituted or unsubstituted cyclic structure $-R^2-R^3-$, and n represents a number preferably ranging from about 100 to about 600. The symbol

represents a plurality of unsubstituted or substituted $—CH_2—$ groups linked together to form the backbone of the chain.

Absorption of water or other hydrogen bonding liquids is enhanced if the substituents to $R^1$, $R^2$, $R^3$, $R^4$, and the backbone itself include groups having hydrogen bonding capability, such as, for example, halides, —COOH, —CN, and $—NO_2$. Additionally, $R^1$, $R^2$, $R^3$, $R^4$, and the backbone itself can include in their structures hydrogen bonding groups, such as

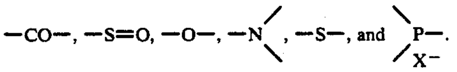

$X^-$ can be a halide, an alkyl sulfonate, preferably having no more than 5 carbon atoms, or any aryl sulfonate, preferably having no more than 14 carbon atoms.

Where water or other aqueous liquids are to be absorbed, a preferred hydrophilic matrix component can be obtained if $R^1$ is selected to be $—(C{=}O)NH(R^7)—$, wherein $R^7$ represents a substituted or unsubstituted divalent alkyl group, preferably having no more than 10 carbon atoms, more preferably no more than 5 carbon atoms. Preferred substituents for $R^7$ are those capable of hydrogen bonding, including —COOH, —CN, and $—NO_2$. Additionally, $R^7$ can include in its structure hydrogen bonding groups, such as

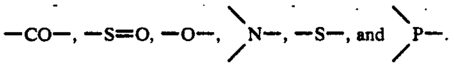

Crosslinkable polymers suitable for the matrix component wherein $R^1$ is $—(C{=}O)NH(R^7)—$ can be prepared by treating polymers or copolymers containing maleic anhydride with an amine having the structure:

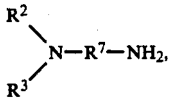

wherein $R^2$, $R^3$, and $R^7$ are as described previously.

A polymeric material particularly useful for this purpose is a copolymer of polymethyl vinyl ether and maleic anhydride, wherein these two monomeric units are present in approximately equimolar amounts. This polymer reacts in the following manner:

(II)

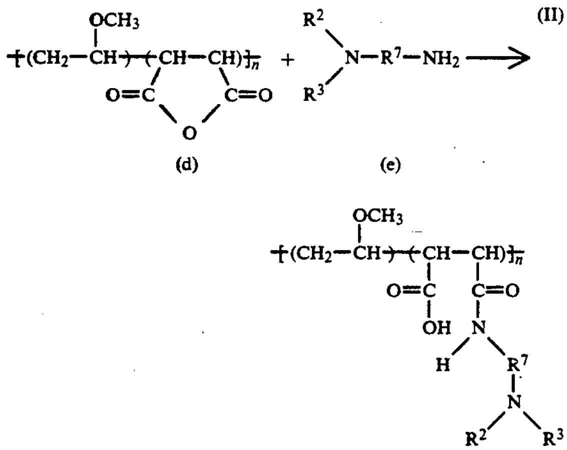

(d) (e)

(f)

wherein $R^2$, $R^3$, $R^7$, and n are as described previously.

Reaction (II) can be conveniently performed by dissolving the polymethyl vinyl ether/maleic anhydride copolymer (reactant (d)) in methyl ethyl ketone, dissolving the amine (reactant (e)) in an alcohol, such as methanol or ethanol, and mixing the two solutions. This reaction proceeds rapidly at room temperature, with agitation. The product of this reaction may begin to form a cloudy suspension, which can be cleared by the addition of water to the solution.

The polymer (f) formed in reaction (II) is particularly useful for SIPNs that utilize a polyvinyl lactam or other water-soluble amide-containing polymer as the absorbent component.

It is desirable for the amine (e) and the product (f) in reaction (II) to be soluble in the solvent medium of this reaction. Because this solvent medium comprises primarily methyl ethyl ketone, alcohol, and water, all of which are strongly hydrogen bonding, the incorporation of hydrogen bonding moieties into $R^2$, $R^3$, and $R^7$ for purposes of liquid absorption in the SIPN is also helpful in promoting solubility of the reactants in reaction (II). Solubility of amine (e) and product (f) in hydrogen bonding media is further enhanced by limiting the number of unsubstituted alkyl carbons in $R^2$, $R^3$, and $R^7$ to the lowest value practicable.

Crosslinkable polymers of the matrix component wherein $R^1$ is —(C═O)—O—$R^7$ can be prepared by treating polymers or copolymers containing maleic anhydride with an amino alcohol having the structure:

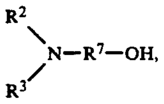

Using copolymer (d) of reaction (II) as the maleic anhydride-containing polymeric material, the reaction proceeds according to the following scheme:

(III)

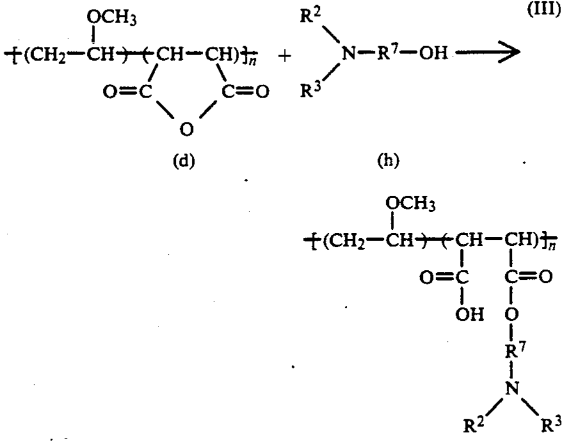

(d) (h)

(i)

wherein $R^2$, $R^3$, and $R^7$ are as described previously.

Reaction (III) can be conveniently performed by dissolving polymer (d) in methyl ethyl ketone, dissolving compound (h) in a separate vessel in methyl ethyl ketone, and mixing the two solutions. This reaction proceeds rapidly at room temperature, with agitation. Reaction product (i) may form a cloudy suspension, which can be cleared by adding water to the mixture.

Alkylating agents (reactant (b)) that have been found useful for quaternization of the matrix component (product (f) of reaction (II) or product (i) or reaction (III)) include:

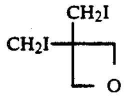

3,3-bis-(iodomethyl)-oxetane

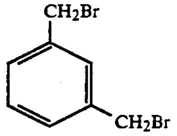

α,α'-m-dibromoxylene

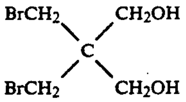

dibromoneopentyl glycol

It has been discovered that the rate of the quaternization reaction can be greatly increased by the addition of an amide-containing polymer to the reaction solution. While polymerization and crosslinking reaction rates can often be increased by the choice of particular solvents, such reaction rates are generally not accelerated by the presence of other polymers, particularly polymers that do not themselves become part of the polymerized or crosslinked product.

While it is the primary function of the matrix component of the SIPN to impart physical integrity and durability to the SIPN, it is the primary function of the absorbent component to promote liquid absorbency. When aqueous liquids are to be absorbed, the absorbent component of the SIPN must be water absorbent, and preferably, water soluble. A particularly preferred class of water-soluble polymers is the polyvinyl lactams, the most readily available and economically suitable of which is polyvinyl pyrrolidone (PVP). Alternatively, non-cyclic, amide-containing, water-soluble polymers, such as polyethyl oxazoline, can comprise the absorbent component of the SIPN.

When PVP is used as the absorbent component of the SIPN and polymer (f) is used as the matrix component of the SIPN, good absorption of aqueous inks is obtained at room temperature if the PVP comprises at least about 30% by weight of the SIPN, more preferably at least about 50% by weight of the SIPN. Higher absorption can be obtained, at the expense of durability, when PVP is present in greater amounts. When PVP comprises more than about 80% of the SIPN, the matrix component is not able to form a complete network, and the entire composition loses its physical integrity when washed with water.

In cases where the SIPNs of the invention are to be used as liquid-receptive layers borne by solid substrates, as in transparent graphical materials, it is convenient to apply such layers to the substrates by way of liquid solution coatings, which are subsequently dried to form a solid layer. A coatable liquid composition can be prepared by adding to the solution formed in reaction (II) or (III) a solution of an amide-containing, water-soluble polymer, such as a polyvinyl lactam or polyethyl oxazoline, along with a suitable alkylating agent, and mixing until a uniform solution is obtained. This solution can then be coated onto a transparent substrate, such as, for example, a polymeric film, and dried. It has been found that the amount of heat required to accomplish the drying in a reasonable time is usually sufficient for causing crosslinking of the matrix component to occur.

Coating can be conducted by any suitable means, such as a knife coater, rotogravure coater, reverse roll coater, or other conventional means, as would be apparent to one of ordinary skill in the art. Drying can be accomplished by means of heated air. If preferred, an adhesion promoting priming layer can be interposed between the applied coating and the substrate. Such priming layers can include primer coatings or surface treatments such as corona treatment, or other appropriate treatment as would be apparent to one of ordinary skill in the art. Adhesion of the SIPN layer can also be promoted by interposing a gelatin sublayer of the type used in photographic film backing between the priming layer and the SIPN layer. Film backings having both a priming layer and a gelatin sublayer are commercially available, and are frequently designated as primed and subbed film backings.

Where the SIPNs of the present invention are to be used to form the ink absorbing layers of films for use in ink-jet printers, it is preferred that the backing of the film have a caliper in the range of about 50 to about 125 micrometers. Films having calipers below about 50 micrometers tend to be too fragile for graphic arts films, while films having calipers over about 125 micrometers tend to be too stiff for easy feeding through many of the imaging machines currently in use. Backing materials suitable for graphic arts films include polyethylene terephthalate, cellulose acetates, polycarbonate, polyvinyl chloride, polystyrene, and polysulfone.

When the SIPNs of the present invention are to be used to form ink absorbing layers of films for ink jet printing, the SIPN layer may further be overcoated with an ink-permeable anti-tack protective layer, such as, for example, a layer comprising polyvinyl alcohol in which starch particles have been dispersed, or a semi-interpenetrating polymer network in which polyvinyl alcohol is the absorbent component. A further function of such overcoat layers is to provide surface properties which help to properly control the spread of ink droplets so as to optimize image quality.

In order to more fully illustrate the various embodiments of the present invention, the following non-limiting examples are provided.

EXAMPLE I

A solution of matrix component of the present invention was prepared by first dissolving 1.3 g of a copolymer of methyl vinyl ether and maleic anhydride ("Gantrez" AN-169, available from GAF Chemicals Corporation) in 24.6 g of methyl ethyl ketone. In a separate vessel, 1.3 g of aminopropyl morpholine (available from Aldrich Chemical Company, Inc.) were dissolved in 11.6 g of methanol. The previously prepared solution of copolymer was then added, dropwise, to the aminopropyl morpholine/methanol solution, after which 36.6 g of distilled water were added to the resulting combined solutions. The resulting solution will hereinafter be called matrix component Solution A.

In yet another vessel, 2.5 g of polyvinyl pyrrolidone (K90, available from GAF Chemicals Corporation) were dissolved in 22.1 g of distilled water. This solution was then added to matrix component Solution A and agitated until a uniform solution was obtained. The resulting solution, hereinafter called blend Solution A, was then divided into 5 samples of 20.0 g each.

The dihalo compound 3,3-bis-(iodomethyl)-oxetane was prepared according to the procedure described in Sorenson, W.R., and Campbell, T.W., *Preparative Methods of Polymer Chemistry*, 2nd Edition, New York, Interscience Publishers, Inc., 1968, p. 376, incorporated herein by reference. A solution of 10 parts by weight of this compound and 90 parts by weight of dimethyl formamide (DMF) was prepared for use as an alkylating agent for crosslinking the matrix component.

Crosslinkable solutions according to the present invention were prepared by adding 0.35 g of the 3,3-bis-(iodomethyl)-oxetane/DMF solution to one of the 20.0 g samples of blend Solution A, 0.70 g of the 3,3-bis-(iodomethyl)-oxetane/DMF solution to a second 20.0 g sample of blend Solution A, and 1.4 g of the 3,3-bis-(iodomethyl)-oxetane/DMF solution to a third 20.0 g sample of blend Solution A.

These solutions were each coated onto a backing of polyethylene terephthalate film having a caliper of 100 micrometers which had been primed with polyvinylidene chloride, over which had been coated a gelatin sublayer of the type used in photographic films for improving gelatin adhesion ("Scotchpar" Type PH primed and subbed film, available from Minnesota Mining and Manufacturing Company). Coating was carried out by means of a knife coater, with the wet thickness of the solution coated onto the film being 75 micrometers. Drying was carried out by exposure to circulating heated air at a temperature of 90° C. for five minutes.

After drying, all three of the solutions resulted in clear SIPN layers which retained their physical integrity when washed with a moving stream of water at room temperature. Exposure to water in selected areas resulted in detectable water absorption, as indicated by swelling of the SIPN layer. Swelling of the SIPN layer was detected by the bump which could be felt by running a finger over the surface of the coated film in such a way as to pass from the portion of the layer not exposed to water to the portion that was exposed to water. Because the amount of crosslinking agent used could be varied over a wide range without failure of crosslinking and without loss of hydrophilicity, it can be concluded that this type of crosslinking is sufficiently tolerant of variability to be useful in a manufacturing process.

EXAMPLE II

A solution of 10.0 parts by weight of α,α'-m-dibromoxylene (available from Aldrich Chemical Company, Inc.) dissolved in 90.0 parts by weight of dimethyl formamide was prepared for use as an alkylating agent for crosslinking of the matrix component of blend Solution A prepared in Example I. This solution was added, in the amount of 0.5 g, to one of the 20.0 g samples of blend Solution A prepared in Example I. The resulting solution was coated, to a wet thickness of 75 micrometers, onto a sheet of the primed and subbed polyethylene terephthalate film of the type described in Example I. As in Example I, drying was carried out by exposure to circulating heated air at a temperature of 90° C. for five minutes. The resulting coating retained its physical integrity when washed with a moving stream of water at room temperature, and was hydrophilic, as indicated by increased thickness in the selected areas exposed to water.

This example indicates that the dihalo compound α,α'-m-dibromoxylene is a suitable alkylating agent for crosslinking of the matrix component in the formation of hydrophilic SIPNs of the present invention.

EXAMPLE III

A solution of 10.0 parts by weight of dibromoneopentyl glycol (available from The Dow Chemical Company) dissolved in 90.0 parts by weight of dimethyl formamide was prepared. This solution was added, in the amount of 0.4 g, to one of the 20.0 g samples of blend Solution A prepared in Example I. The resulting solution was coated by means of a knife coater, onto a sheet of the "Scotchpar" Type PH primed and subbed film of the type described in Example I, to a wet thickness of 75 micrometers, and dried by exposure to circulating air at a temperature of 90° C. for five minutes. The resulting coating did not retain its physical integrity when washed with running water at room temperature, but dissolved and washed away readily. A second sample was prepared in the same manner as the first, except that drying temperature was increased to 125° C. for five minutes. This coating did retain its physical integrity when washed with running water, and was hydrophilic, as indicated by swelling of the coated layer in selected areas exposed to water.

This example shows that not all dihalo alkylating agents crosslink at equal rates, and that some may require more favorable reaction conditions, such as a higher drying temperature.

COMPARATIVE EXAMPLE A

A solution of 1.0 g of a copolymer of methyl vinyl ether copolymerized with maleic anhydride ("Gantrez" AN-169, available from GAF Chemicals Corporation) dissolved in 19.0 g of methyl ethyl ketone was prepared. In a separate vessel, 0.9 g of aminopropyl morpholine was dissolved in 10.0 g of methanol. The 20.0 g of the copolymer ("Gantrez" AN-169) solution was added to the aminopropyl morpholine/methanol solution, followed by the addition of 15.0 g of water to the mixture. A cloudy precipitate formed, which subsequently dissolved after addition of the water, resulting in a clear solution. To this solution was added 0.5 g of 3,3-bis-(iodomethyl)-oxetane, prepared as described in Example I, which was dispersed in the solution by agitation, leaving a clear solution.

This solution was coated onto a sheet of primed and subbed polyethylene terephthalate film of the type described in Example I. Coating was carried out by means of a #20 Mayer rod, followed by drying at a temperature of 90° C. for five minutes. The resulting dried layer was hazy and dissolved readily in a moving stream of water at room temperature.

This example is similar to Example I, except that the polyvinyl pyrrolidone was not present. While the crosslinkable polymer was very similar to the matrix component in Example I, the alkylating agent (3,3-bis-(iodomethyl)-oxetane) was the same one used in Example I, and the reaction conditions (90° C. for five minutes) were the same as in Example I, a clear, water-insoluble coating was not formed. It can therefore be concluded that polyvinyl pyrrolidone plays an essential role in the crosslinking reaction of this example.

EXAMPLE IV

A solution of a crosslinkable matrix component was prepared by first dissolving 0.9 g of aminopropyl morpholine (available from Aldrich Chemical Company, Inc.) in 10.0 g of methanol at room temperature. In a separate vessel, 1.0 g of a copolymer of polymethyl vinyl ether and maleic anhydride ("Gantrez" AN-169, available from GAF Chemicals Corporation) was dissolved in 19.0 g of methyl ethyl ketone. The resulting copolymer solution was added, along with 15.0 g of distilled water, to the aminopropyl morpholine/methanol solution. To this solution was then added 0.5 g of 3,3-bis-(iodomethyl)-oxetane, prepared as described in Example I. The resulting solution will hereinafter be called crosslinkable matrix component Solution B.

In a separate vessel, an absorbent component for the SIPN was prepared by dissolving 1.0 g of polyethyl oxazoline (PEOX, High Molecular Weight Grade, available from The Dow Chemical Company) in 19.0 g of distilled water at room temperature. This solution was then added to crosslinkable matrix component B, and agitated at room temperature, until a clear solution was obtained.

The solution was coated onto the primed and subbed polyethylene terephthalate film of the type described in Example I. Coating was conducted by means of a #20 Mayer rod, and drying was conducted by means of circulating air at a temperature of 90° C., for five minutes. The haze of the resulting SIPN layer was too high for use in overhead projection. The layer can be used in cases wherein viewing is performed in the direct mode, rather than the projected mode. The coating was hydrophilic but retained its physical integrity when subjected to a stream of water at room temperature. This example illustrates that SIPN layers prepared according to the present invention can exhibit a range of haze levels, some of which are suitable for use in applications where images can be viewed in a projection mode.

EXAMPLE V

A solution of a matrix component suitable for the present invention was prepared by first dissolving 1.0 g of a copolymer of methyl vinyl ether and maleic anhydride ("Gantrez" AN-169, available from GAF Chemicals Corporation) in 19.0 of methyl ethyl ketone. In a separate vessel, 0.83 g of 3-dimethylamino-1-propanol (available from Aldrich Chemical Company, Inc.) was dissolved in 16.6 g of methyl ethyl ketone. The copolymer ("Gantrez" AN-169) solution was then added to the 3-dimethylamino-1-propanol/methyl ethyl ketone solution and stirred for 30 minutes. Initially, small globular particles formed, which, upon stirring, broke down to form a slurry. In a separate vessel, 1.8 g of polyvinyl pyrrolidone (K90, available from GAF Chemicals Corporation) was dissolved in 16.5 g of distilled water. This solution was added, along with 10.0 g of methanol and 8.3 g of distilled water, to the slurry. The slurry was stirred for about 60 hours, whereupon it was found to have become a clear solution, hereinafter called blend Solution C.

A 20.0 g sample of blend Solution C was placed in a separate vessel, and 0.45 g of 3,3-bis-(iodomethyl)oxetane, prepared as described in Example I, was added. This mixture was agitated until a homogeneous solution was obtained. This solution was coated onto the primed and subbed polyethylene terephthalate film of the type described in Example I by means of a #20 Mayer rod, and dried for five minutes with circulating air at a temperature of 90° C. The resulting SIPN layer was clear, and retained its physical integrity when washed with a stream of water at room temperature.

A second 20.0 g sample of blend Solution C was placed in a separate vessel, and 0.025 g of $\alpha,\alpha'$-p-dichloroxylene was added. This mixture was agitated until a homogeneous solution was obtained. This solution was coated onto the primed and subbed polyethylene terephthalate backing described in Example I by means of a #20 Mayer rod, and dried for five minutes with circulating air at a temperature of 90° C. The resulting SIPN layer was clear and hydrophilic, and retained its physical integrity when subjected to a stream of water at room temperature.

EXAMPLES VI TO VII AND COMPARATIVE EXAMPLES B AND C

The following examples illustrate the use of water-swellable, but not water-soluble, polymers in the formation of water-absorbing semi-interpenetrating polymeric networks.

EXAMPLE VI

A monofunctional polyoxyalkyleneamine based on predominantly propylene oxide (0.6 g, "Jeffamine" M-2005, Texaco Chemical Co.) was dissolved in 5 g of acetone. The solution was added to 5 g of a 10% solution of styrene-maleic anhydride copolymer ("Scripset" 540, Monsanto Company) in methyl ethyl ketone. The reaction mixture was stirred for 15 minutes, then 0.2 g of 1-amino-3-methoxypropane (Texaco Chemical Co.) dissolved in 5 g of acetone was added. A slightly hazy solution resulted. (When this polymeric solution was poured into water, it coagulated into a white lump.)

A second solution was prepared by adding a solution of 0.75 g of a monofunctional polyoxyalkyleneamine based on predominantly ethylene oxide ("Jeffamine" M-2070, Texaco Chemical Co.) in 5 g of acetone to 5 g of a 10% solution of maleic anhydride/methyl vinyl ether copolymer ("Gantrez" AN-139, GAF Chemicals Corporation) in methyl ethyl ketone. The mixture was stirred for 15 minutes and then a solution of 0.08 g of 1-amino-3-methoxypropane and 0.12 g of 2-dimethylaminoethanol (Aldrich Chemical Co.) dissolved in 5 g of acetone was added. After the solution stood for 15 minutes, 5 g of water was added thereto.

The two solutions were combined and then 0.1 g of 3,3-bis-(iodomethyl)-oxetane crosslinking agent was dissolved in the combined solution. N-methyl pyrrolidone (10 g) was added to the mixture to prevent phase separation as the solution was dried down to form a film. Without it, as the more volatile organic solvents begin to evaporate and the mixture becomes richer in water, the water-insoluble polymer comes out of solution and forms a separate phase.

The solution containing the crosslinking agent was coated onto primed and subbed polyethylene terephthalate film of the type described in Example I at a wet thickness of 125 micrometers, and the coating was dried at a temperature of 95° C for 10 minutes, thereby providing a very slightly hazy film which, when immersed in water, swelled but did not dissolve. In the water-swollen state, the film was quite hazy.

Comparative Example B

The procedure of Example VI was repeated, with the exception that the 3,3-bis(iodomethyl)-oxetane crosslinking agent was omitted from the formulation. A coating of this material was clear and also did not wash away in water. The difference in the degree of swelling between the film of this example was much less than in films in which the uncrosslinked polymer was water-soluble. Polymeric films incorporating water-soluble resins swell to a much greater degree than do water-swellable resins.

EXAMPLE VII

A terpolymer consisting of 85 parts by weight of methyl methacrylate, 15 parts by weight of hydroxyethyl methacrylate, and 5 parts by weight of acrylic acid was dissolved in a mixture containing 14% ethanol and 86% ethyl acetate to give a solution containing 26% dry solids. This solution was diluted to 10% solids by the addition of methyl acetate.

A second polymeric solution was prepared by first reacting 0.75 g of a monofunctional polyoxyalkyleneamine based on predominantly ethylene oxide ("Jeffamine" M-2070, Texaco Chemical Co.) dissolved in 5 g of methyl acetate with 5 g of a 10% solution of maleic anhydride/methyl vinyl ether copolymer ("Gantrez" AN-139, GAF Corp.) in methyl acetate. This mixture was stirred for 15 minutes; then a solution containing 0.1 g of 1-amino-3-methoxypropane and 0.1 g of 2-dimethylaminoethanol dissolved in 5 g of acetone was added to the mixture. After the mixture was stirred for 30 minutes, 3 g of methanol and 20 g of water were added thereto. Finally, 0.1 g of 3,3-bis-(iodomethyl)-oxetane crosslinking agent was added to the solution and allowed to dissolve. Six (6) g of this solution was mixed with 4 g of a 10% solution of polyvinylpyrrolidone in a solution of methanol (50%) and methyl acetate (50%). To this solution was added 2 g of the 10% terpolymer solution described previously. N-methyl pyrrolidone (2 g) was added to the solution, which was then coated at a wet thickness of 125 micrometers onto primed and subbed polyethylene terephthalate film of the type described in Example I. The mixture was dried for 10 minutes at a temperature of 95° C, giving a clear film which swelled with water when immersed in a water bath, but did not dissolve or delaminate from the polyester film.

COMPARATIVE EXAMPLE C

A solution was prepared by mixing 6 g of the solution of Example VII that contained the 3,3-bis-(iodomethyl)-oxetane with 6 g of the 10% solution of polyvinyl pyrrolidone in the methanol/methyl acetate solvent. N-methyl pyrrolidone (2 g) was added, and the mixture was coated at a wet thickness of 125 micrometers onto primed and subbed polyethylene terephthalate film of the type described in Example I. The mixture was dried for 10 minutes at a temperature of 95° C. to give a clear film. When this film was immersed in a water bath, it swelled to a much greater degree than did the corresponding film containing the water-insoluble terpolymer. It did not dissolve or delaminate from the polyester film.

Examples VI and VII show that the interpenetrating polymeric networks can be formed with polymers that are water-swellable but not water-soluble. In these cases, it is necessary to apply the coatings from non-aqueous solvents (or at least from mixtures of organic solvents and water). The presence of the water-insoluble polymer will usually improve the durability of the polymeric film in the water-swollen state, but at the expense of the level of water absorption capability that can be achieved.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A transparent film comprising a transparent backing bearing on at least one major surface thereof a layer formed from a composition comprising (a) a polymeric matrix component comprising crosslinked tertiary amino moieties and carboxyl moieties said matrix component having one carboxyl moiety for each amino moiety that has been crosslinked, and (b) a liquid-absorbent component comprising a water-absorbent polymer that is not crosslinked.

2. A film according to claim 1, wherein said layer is further overcoated with an ink-permeable anti-tack protective layer.

3. A transparent film comprising a transparent backing bearing on at least one major surface thereof a layer formed from a composition comprising (a) a polymeric matrix component comprising crosslinked tertiary amino moieties and carboxyl moieties said matrix component having one carboxyl moiety for each amoni moiety that has been crosslinked, and (b) a liquid-absorbent component comprising a water-soluble polymer that is not crosslinked.

4. The film of claim 1, wherein said water-absorbent polymer is water-swellable.

5. The film of claim 1, wherein said tertiary amino moieties are located in pendant side groups of said matrix component.

6. The film of claim 1, wherein said tertiary amino moieties are crosslinked by an alkylating agent.

7. The film of claim 6, wherein said alkylating agent is selected from the group consisting of dihalides and disulfonates.

8. The film of claim 7, wherein said alkylating agent is selected from the group consisting of 3,3-bis-(iodomethyl)-oxetane, $\alpha,\alpha'$-m-dibromoxylene, and dibromoneopentyl glycol.

9. The film of claim 1, wherein amide groups are present in said water-absorbent polymer.

10. The film of claim 3, wherein said water-soluble polymer contains vinyl lactam groups.

11. The film of claim 10, wherein said vinyl lactam is polyvinyl pyrrolidone.

12. The film of claim 1, wherein said matrix polymer has the structure:

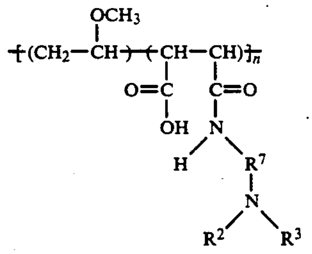

wherein $R^2$ and $R^3$ independently represent a group selected from the group consisting of substituted and unsubstituted alkyl groups having up to 10 carbon atoms, and substituted and unsubstituted aryl groups having up to 14 carbon atoms, or $R^2$ and $R^3$ can be connected to form the substituted or unsubstituted cyclic structure $-R^2-R^3-$, $R^7$ represents a substituted or unsubstituted divalent alkyl group having up to 10 carbons, and n represents a number from about 100 to about 600.

13. The film of claim 1, wherein said matrix polymer has the structure:

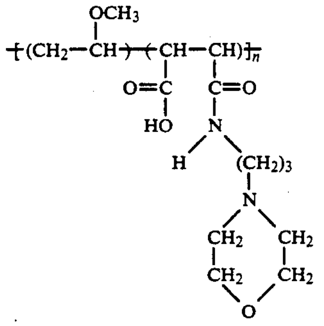

where n represents a number from about 100 to about 600.

14. The film of claim 1, wherein said matrix polymer has the structure:

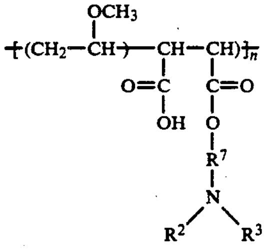

wherein $R^2$ and $R^3$ independently represent a group selected from the group consisting of substituted and unsubstituted alkyl groups having up to 10 carbon atoms, and substituted and unsubstituted aryl groups having up to 14 carbon atoms, or $R^2$ and $R^3$ can be connected to form the substituted or unsubstituted cyclic structure $-R^2-R^3-$, and $R^7$ represents a substituted or unsubstituted divalent alkyl group having up to 10 carbon atoms, and n represents a number from about 100 to about 600.

15. The film of claim 14, wherein said matrix polymer has the structure:

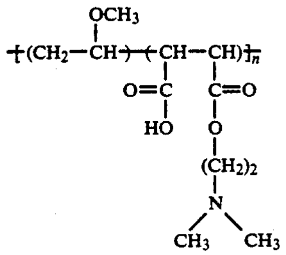

where n represents a number from about 100 to about 600.

16. The film of claim 1, wherein said matrix component is produced by reacting a copolymer containing maleic anhydride with an amine selected from the group consisting of compounds having the structures:

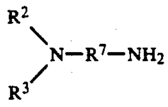
and
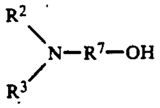

wherein $R^2$ and $R^3$ represent members independently selected from the group consisting of substituted and unsubstituted alkyl groups having up to 10 carbon atoms, substituted and unsubstituted ester groups having up to 10 carbon atoms, and substituted and unsubstituted aryl groups having up to 14 carbon atoms, $R^7$ represents a substituted or unsubstituted divalent alkyl group having up to 10 carbon atoms, wherein said substituents are selected from the group consisting of halides, —COOH, —CN, and $—NO^2$.

17. The film of claim 16, wherein said $R^2$, $R^3$, and $R^7$ further contain moieties selected from the group consisting of —CO—,—O—, and —S═O.

18. The film of claim 17, wherein $R^2$ and $R^3$ are connected to form a ring structure.

19. The film of claim 16, wherein said amino, alkyl, and ester groups have up to 5 carbon atoms.

20. The film of claim 16, wherein $R^2$ and $R^3$ are connected to form a ring structure.

21. The film of claim 1, wherein said crosslinked polymer comprises at least 20% by weight of the composition.

22. The film of claim 1, further including a crosslinking agent.

* * * * *

UNITED STATES PATENT AND TRADEMARK OFFICE

CERTIFICATE OF CORRECTION

PATENT NO. : 5,192,617

DATED : March 9, 1993

INVENTOR(S) : Stofko, Jr. et al.

It is certified that error appears in the above-identified patent and that said Letters Patent is hereby corrected as shown below:

Col. 13, line 51, "amoni" should be --amino--.

Signed and Sealed this

Eleventh Day of January, 1994

Attest:

BRUCE LEHMAN

*Attesting Officer* *Commissioner of Patents and Trademarks*